UNITED STATES PATENT OFFICE 2,354,156

LIGHT-WEIGHT COMPOSITION AND ITS PRODUCTION

Glenn Sucetti, Los Angeles, Calif., assignor to Universal Zonolite Insulation Co., Chicago, Ill., a corporation of Montana No Drawing. Application July 30, 1941, Serial No. 404,627

10 Claims. (Cl. 106—86)

Prior to the present discovery and invention, vermiculite composition or concrete had been made by mixing expanded or exfoliated vermiculite with Portland-cement, clay, or other binders, either singly or in combination, but due to settlement of the binder-medium employed, it had been necessary to limit the water used to an almost dry mixture which was exceedingly difficult to remove from the cement-mixer or to pour through chutes or hoppers ordinarily used by contractors on large jobs, and, in most cases, such difficulties increased the cost of production.

The top face of such a poured slab could not be levelled down to a smooth closed surface in the lighter weight densities (for example, 30 pounds to the cubic-foot) because the water and binder settled below the surface due to their greater weight, cement weighing about 100 pounds per cubic-foot and water approximately 62 pounds, whereas the expanded-vermiculite weighed about 7 pounds. As a result, these surfaces were objectionally open, granular and more costly to bond a roofing-felt to.

In an attempt to overcome this undesirable and disadvantageous condition, a half-inch surfacing-mixture of Portland-cement, water and sand was specified and used, because it was found that the top surface portion of such a concrete roof fill had much less strength than the bottom surface section, which, obviously was not the uniform density and strength throughout that was desired or required in the composition.

Although this weakness or defect was recognized, there was then no known procedure for remedying it, and the present invention and discovery occurred in a round-about way not necessary to detail here.

The final result was the revelation that, if a slow-breaking asphalt-agent, dispersed in an aqueous phase, and containing saponified "Vinsol" resin as a stabilizing-agent were used in proper proportion to the exfoliated vermiculite, binder and water, marked and unforeseen advantages accrued in that the composition frothed and bulked, an equal or greater volume of product was made at less cost, the product was water-repellent, the binder was substantially-uniformly distributed throughout the product, greater strength was present, a more uniform insulation quality seemingly resulted, stronger surface strength was effected for walking-decks, Bermuda roofs and for the application of standard roofing material, less installation costs accrued, and better workability was available.

Referring again to the bituminous-emulsion, "Vinsol" resin is a trade-name for a product manufactured by the Hercules Powder Company and is referred to in United States Patent No. 2,114,393, Lane, Grease-proof impregnated article and method of preparing, granted April 19, 1938, and is more fully disclosed in United States Patent No. 2,193,026, Hall, Resin and process of producing, granted March 12, 1940.

United States Patents No. 2,155,141, Maters et al., Emulsifying agents and processes of making same, granted April 18, 1939, and 2,199,206, Maters et al., Bituminous emulsion, granted April 30, 1940, disclose methods of saponifying "Vinsol" resin.

A suitable asphalt-emulsion for the purpose indicated may be prepared by mixing approximately 55 parts by weight of 50–60 penetration asphalt from California crude petroleum with about 43.35 parts of hot water containing substantially 0.15 parts of caustic-soda to produce a quick-breaking emulsion by the well-known processes as specified in United States Patent No. 1,643,675, Montgomerie, Bituminous emulsion, granted September 27, 1927, and incorporating therein about 1.5 parts of saponified "Vinsol" resin to convert the emulsion to the slow-breaking mixing type of emulsion The new vermiculite-composition may be made by using 5 cubic-feet of minus 10 plus 65 mesh expanded-vermiculite, 1 bag of Portland-cement weighing about 94 pounds, 5½ quarts of the specified asphalt–emulsion, and 3¼ gallons of water per cubic-foot of the exfoliated-vermiculite aggregate, such composition being conveniently produced by mixing the water, cement and bituminous-emulsion in a concrete-mixer for about two and one-half minutes after which the vermiculite is added and the mixing continued for about another like period.

What apparently occurs is this: When the resulting emulsion in the mixture enters the surface-interstices of the hydrophilic expanded-vermiculite aggregate-granules, the asphalt-medium thereof when set or hardened renders such particles water-resistant, and also upon such entrance of the emulsion into such small cavities of the aggregate, it expels the air from such spaces, but such ejected or evicted air, instead of escaping from the surrounding emulsion, because of the peculiar characteristics of the latter, forms practically-spherical air-bubbles entrapped substantially-uniformly in the enveloping emulsion, such bubbles being encased in the emulsion in which the cement-particles are substantially-uniformly distributed and by which they are prevented from settling in the mixture, hence affording the product practically-unvarying strength throughout its thickness.

The resulting films around the expanded-vermiculite granules, during drying, develop a substantial degree of surface-tension making the surfaces of such particles more stable physically.

The specified emulsion, in addition to rendering the expanded-vermiculite granules water-repellent, produces also the same or comparable characteristics in the binder itself, and, due to the great surface-area of the binder, the greater portion of the water-repellent producing medium is employed to treat the binder, the remainder acting similarly on the aggregate-particles.

The indicated frothing or bulking of the mixture due to the retention therein of the air discharged from the surface crevices of the vermiculite-granules increases the volume of the product, and the mixture is sufficiently fluid to pour freely, the bubbles aiding the production of such property.

When a light-weight concrete is made, even employing an agent therein which produces water-repellency in the product, there is a marked shrinkage in the bulk of the product, in some cases as much as 30%, as compared with that of the aggregate originally introduced into the mixture, but by using the type of asphalt-emulsion referred to, or its equivalent, the bulking effected thereby can be controlled so that the volume of the product will be the same as that of the original aggregate or the process can be controlled by the proportion of the ingredient of the mixture to provide a product in some cases as much as or somewhat more than 20% greater in volume than that of the aggregate introduced into the mixture.

It has been found that the bulking effect is very uniform and that the Portland-cement is held in suspension even though the mixture be made quite wet.

A test of the top portion of a 4-inch slab disclosed that it has the same strength as the bottom portion of the slab even though 10% more water was used than was ordinarily employed.

A microscopic study of a cross-section of a cured sample has shown that apparently the Portland-cement is uniformly distributed around the outside of each minute bubble and that there is less cement between the edges of the aggregate granules or between the leaves of the aggregate particles than under previous practice without the employment of such an emulsion.

In the past, in order to obtain the proper plasticity, one was forced to add more water than was advisable if the composition was to be applied and dried out properly, but by using the emulsion of the character specified, it was discovered that even though less over-all water or liquid content was used to plasticize the mixture, a free-flowing mixture was nevertheless obtained, this seemingly being caused by less water penetrating the aggregate granules.

In addition it was found that when an insufficient quantity of such emulsion was used, the bubbles would break and the final bulking effect was reduced, but by using the required amount of the emulsion with the combined expanded vermiculite and Portland-cement or clay or other binders, the film strength of the bubbles was sufficient to give practically uniform bulking.

When a greater amount of the emulsion was employed, slightly better water-repellent qualities resulted, but the bulking advantage was not increased to any appreciable extent.

The bubbles which are formed by the bulking action are so strong in film strength that in placing the mixed material in a tall cylinder and vibrating it, the bubbles are placed under slight pressure and after a few minutes this bulking action will increase the volume as much as 5% until the pressure is equalized.

The bulking effect is uniform because the overall volume of air contained in the bubbles is equal to the displaced air between the edges of the vermiculite granules, and when the emulsion films the granules the air is forced out and is entrapped by the emulsion-film.

The mixture, as it is poured from the mixer, consists of vermiculite-granules which have been filmed by the emulsion and which carry cement and spherical air-bubbles which also carry cement.

It has been revealed under job conditions that greater strengths are possible when using the emulsion because the binder or binders is or are practically-uniformly distributed, the greater strength seemingly not being due to any strength in the bonding properties of the emulsion, but entirely to the bubbles giving better distribution of the binder or binders.

It is estimated that the film thickness when dry surrounding each granule, as well as each particle of binder, is not over 2 microns in thickness, or 1/25000 of an inch, and such film can be subjected to boiling in water without disintegration.

Greater heat and cold insulation can ostensibly be expected from the employment of the emulsion-treated composition as against a product untreated in this manner, this being apparently due to the non-intercommunicating air-pockets in the composition plus the presumable fact that less binder is carried into the leaflike structure of the vermiculite-composition, the minute system of round hollow spheres also tending to separate the composition into a more uniform structure.

When the material is poured in place, there is no material breakdown in particles in placement and as long as 15 minutes of mixing time in a concrete-mixer has not appreciably lessened the bulk or increased the density.

In some cases, it is desirable to use magnesite as the binder for the aggregate, preferably but not necessarily exclusively, exfoliated or distended vermiculite, and the results are quite comparable to those hereinabove specified in that a similar degree of bulking occurs due to the same retention of the air exhausted from the aggregate particles and the product is fine-structured suitable for use as a light-weight flooring of superior water-repellency and toughness and for use for other purposes.

A typical example of a mixture by weight for the production of such a magnesite-bound vermiculite-composition is as follows:

|  | Per cent |
| --- | --- |
| Magnesium oxide (commercial grade) | 55 |
| Exfoliated vermiculite (−10 +20 mesh) | 11 |
| Exfoliated vermiculite (−24 +65 mesh) | 11 |
| Silica dust (of 99% SiO$_2$, 85% of which passes through a #200 sieve) | 15 |
| The bituminous-emulsion | 8 |

The above named ingredients are mixed with an equal amount by weight of 22° Baumé solution of magnesium-chloride to form a workable mixture.

Other appropriate binders, such as Lumnite-cement or plaster-of-Paris can in some instances be used to advantage, the mixture for Lumnite-cement being the same as that specified above for Portland-cement, except for the change of binder.

Whereas various details have been presented above, those acquainted with this art will readily understand that the invention is not necessarily limited and restricted to these precise features, and that various modifications or changes may be resorted to without departure from the heart and essence of the invention as defined by the appended claims and without the loss or sacrifice of any of its substantial or material benefits accruing from the use of the invention.

I claim:

1. In the process of making a light-weight concrete, including mixing a light-weight porous aggregate of under 50 pounds per cubic-foot including at least 80% of exfoliated-vermicuite by volume, a binder and water and permitting the mixture to set, the novel features being the inclusion in said mixture of an asphalt-emulsion containing a saponified-resin as a stabilizing-agent and having the property of maintaining the bulk of the mixture, upon completion of its mixing, at least equal to the bulk of the original aggregate introduced into the mixture, said bulking of the mixture being produced by said emulsion entrapping and permanently retaining as substantially-uniformly-distributed air-cells the air expelled from the cavities of the aggregate particles by the entrance of the liquid into their interstices, which action renders the aggregate water-repellent, the binder being practically evenly dispersed throughout the emulsion by which it is also rendered water-resistant.

2. The novel features in the process of making a light-weight concrete presented in claim 1 in which said saponified-resin is "Vinsol."

3. The novel process features set forth in claim 1 in which the aggregate is —10+65 mesh expanded-vericulite, in which the binder is Portland-cement, and in which said ingredients are used in the approximate proportions of 5 cubic-feet of the expanded-verimiculite, 1 bag of Portland-cement (approximately 94 pounds), 5½ quarts of the asphalt-emulsion and 3¼ gallons of water per cubic-foot of the expanded-vermiculite aggregate.

4. The novel process features set forth in claim 1 in which the aggregate is —10+65 mesh expanded-vermiculite, in which the binder is Portland-cement, and in which said ingredients are used in the approximate proportions of 5 cubic-feet of the expanded-vermiculite, 1 bag of Portland-cement (approximately 94 pounds), 5½ quarts of the asphalt-emulsion and 3¼ gallons of water per cubic-foot of the expanded-vermiculite aggregate, the mixing order being first water, cement and asphalt-emulsion after which the expanded-vermiculite is added with further mixing.

5. The novel process features set forth in claim 1 in which said emulsion is made by mixing by weight approximately 55 parts of 50–60 penetration asphalt with about 43.35 parts of hot water containing substantially 0.15 part of caustic-soda to produce a quick-breaking emulsion and incorporting therein about 1.5 parts of saponified "Vinsol" resin to convert the emulsion to the slow-breaking mixing type.

6. The novel process features set forth in claim 1 in which said asphalt-emulsion is made by mixing by weight approximately 55 parts of 50–60 penetration asphalt with about 43.35 parts of hot water containing substantially 0.15 part of caustic-soda to produce a quick-breaking emulsion and incorporating therein about 1.5 parts of saponified "Vinsol" resin to convert the emulsion to the slow-breaking mixing type, and in which said aggregate is —10+65 mesh expanded-vermiculite, in which the binder is Portland-cement, and in which said ingredients are mixed in the approximate proportions of 5 cubic-feet of the expanded-vermiculite, 1 bag of Portland-cement (approximately 94 pounds), 5½ quarts of said asphalt-emulsion and 3¼ gallons of water per cubic-foot of the aggregate, the mixing order being first water, cement, and asphalt-emulsion after which the expanded-vermiculite is added with the further mixing.

7. The novel process features set forth in claim 1 in which the bulk of the mixture, upon completion of its mixing, is greater than that of the original aggregate by reason of air introduced by the mixing operation.

8. The novel process features set forth in claim 1 in which the buk of the mixture, upon completion of its mixing, is at least 10 percent greater than that of the original aggregate by reason of air introduced by the mixing operation.

9. A water-repellent light-weight concrete incorporating a light-weight porous aggregate of under 50 pounds per cubic-foot including at least 80% of exfoliated-vermiculite by volume, a binder, and a bituminous-medium containing a saponified-resin as a stabilizing-agent, the novel features being that (a) said bituminous-medium renders the aggregate-particles and the binder water-repellent, (b) said binder is substantially-uniformly-distributed throughout the concrete, (c) the concrete contains substantially-uniformly-distributed air-cells encased within the water-repellent medium and its associated binder, and (d) the aggregate particles are practically evenly distributed throughout the concrete.

10. The light-weight concrete set forth in claim 9 in which the aggregate is expanded-vermiculite, and in which the saponified-resin is "Vinsol."

GLENN SUCETTI.